(12) United States Patent
Chen et al.

(10) Patent No.: US 6,791,041 B1
(45) Date of Patent: Sep. 14, 2004

(54) IA SWITCH

(76) Inventors: Kuo-Sheng Chen, No. 19, Alley 6, Lane 105, Jiungung Rd., Wenshan Chiu, Taipei (TW), 116; Jung-Hua Chen, 12Fl.-2, No. 322, Sec. 1, Guangfu Rd., Hsinchu (TW), 300; Tung-Pai Chen, 12Fl.-2, No. 322, Sec. 1, Guangfu Rd., Hsinchu (TW), 300

( * ) Notice: Subject to any disclaimer, the term of this patent is extended or adjusted under 35 U.S.C. 154(b) by 0 days.

(21) Appl. No.: 10/397,189

(22) Filed: Mar. 27, 2003

(51) Int. Cl.7 ............................................... H01H 13/70
(52) U.S. Cl. ................................... 200/51 R; 200/293
(58) Field of Search ........................... 200/51 R, 51.02, 200/51.04, 51.05, 51.07, 51.14, 293; 335/205–207; 174/250–268; 361/760–764, 720

(56) References Cited

U.S. PATENT DOCUMENTS 5,631,673 A * 5/1997 Yamamoto et al. ......... 361/681
6,050,494 A * 4/2000 Song et al. .................. 235/492
6,065,988 A * 5/2000 Kubota ........................ 439/329
6,092,205 A * 7/2000 Han ............................ 713/300
6,454,589 B1 * 9/2002 Yeh ............................. 439/352

* cited by examiner

Primary Examiner—Elvin Enad
Assistant Examiner—Lisa Klaus
(74) Attorney, Agent, or Firm—Troxell Law Office PLLC

(57) ABSTRACT

An IA switch including a base seat, circuit board and panel. The base seat is connected to a connector, holes are disposed at the backside of the connector. The circuit board is integrated with a plug, chip, relay and lamp-attached button switch. The circuit board is combined with said panel at a backside. The plug is combined with said panel at a backside. The plug is combined with the connector at a front side. The panel has holes corresponding to the lamp-attached button switches. Front ends of the button switches are projected out of the holes. The panel is combined with the outside of the base seat. A picture and plastic film are stuck on the outside of the panel one after another.

16 Claims, 5 Drawing Sheets

IA SWITCH

BACKGROUND OF THE INVENTION

1. Field of the Invention

The present invention relates to an electric switch, and more particularly to a switch connected with a general appliance, such as a lamp, electromagnetic switch, alarm and etc., so as to allow the appliance to practice Internet access; or connected with an Internet accessible appliance, such as an Internet accessible television, freezer, air conditioner and etc.; and having input signal receiving function to connect and receiving the signal output from safety detector, sensor and etc.; and switching on and off an appliance by far end control through Internet or the received output message from the sensor.

2. Description of Related Art

A lamp installed on a ceiling or higher place is conveniently switched on and off through a switch, which is always installed at a lower place on a wall.

A socket or switch panel structure is disclosed in Taiwan Patent No. 319,449. A socket or switch structure, which is normally installed in a wall, is shown in FIG. 4 and FIG. 5 of the patent, it comprises a frame used to connect with a socket or switch, and connected with the inside of an installment space on the wall. A panel is connected to the outside of the frame, and the socket or the switch exposed at an opening in the middle thereof is used to allow a user to insert a plug or button switch.

Taiwan patent No. 321,357 reveals an appliance switch panel structure; a panel with modeling and a small luminous lamp in the structure is used to replace the conventional switch panel, it has a sticker paper to stick thereon. The sticker paper has a pattern to match up with the panel modeling; this allows a switch installed on a wall has a pattern and small luminous lamp functions.

The switch disclosed in the above-mentioned patent is not furnished with a structure for connecting with Internet so that it cannot allow a general appliance connected with it to be Internet accessible and cannot control the on or off of an appliance through Internet from a far end.

SUMMARY OF THE INVENTION

The present invention is brought up to combine an Internet line and power cord so that a user can control the on and off of an Internet accessible appliance from a far end through Internet.

Therefore, the main object of the present invention is to provide an IA switch (Internet/Information/Intelligent appliance switch); the switch can combine Internet lines and power cords so as to connect with Internet and control the on and off of an appliance from a far end.

Another object of the present invention is to provide an IA switch, Internet lines and power cords are easily installed therein and a circuit board and panel equipped with a different switch or socket can be conveniently changed according to the need.

Still another object of the present is to provide an IA switch, different patterns can be changed according to the need; this can make the switch more personalized and artistic.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
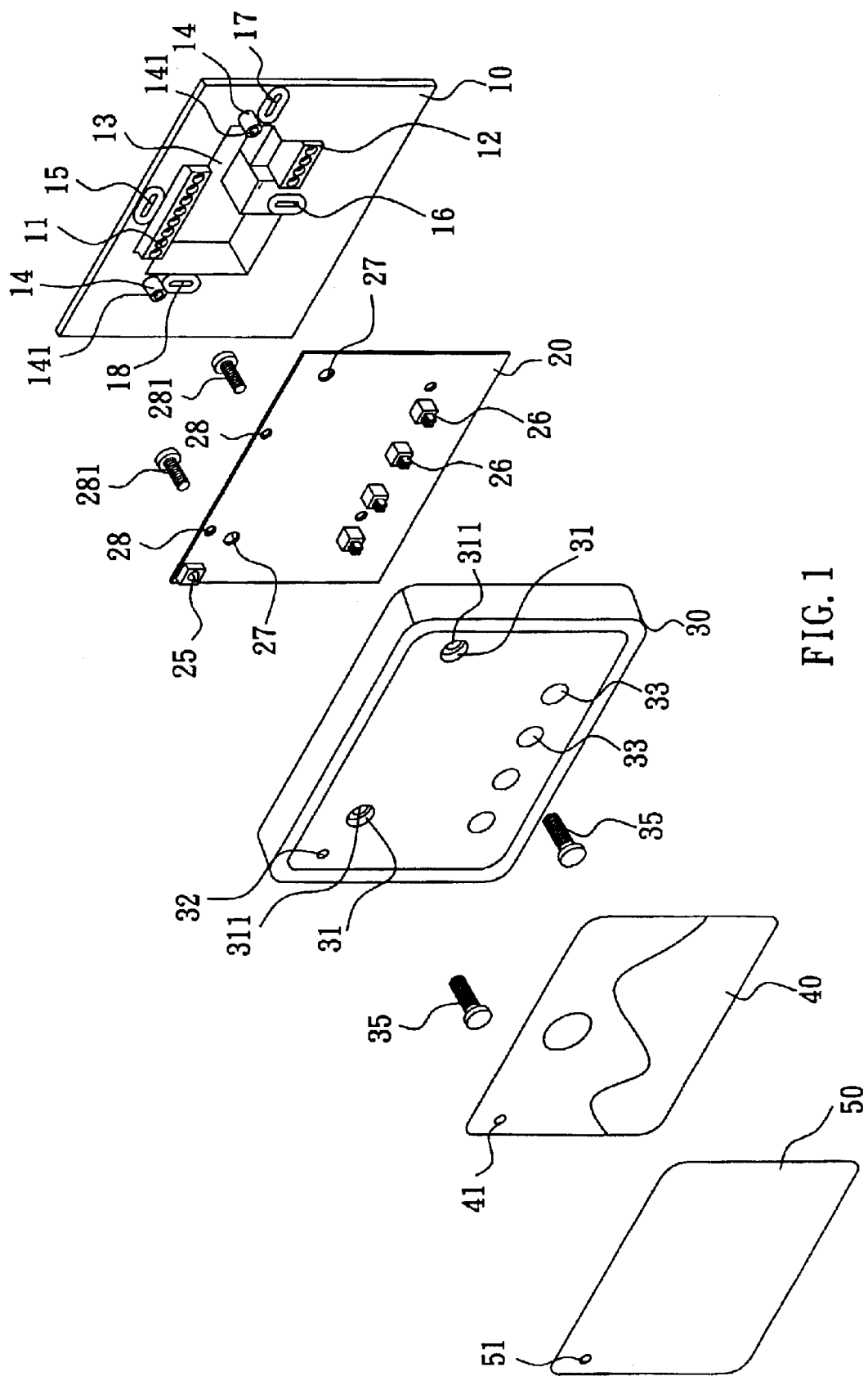
FIG. 1 is an explosive view of an IA switch according to the present invention.
Figure 3:
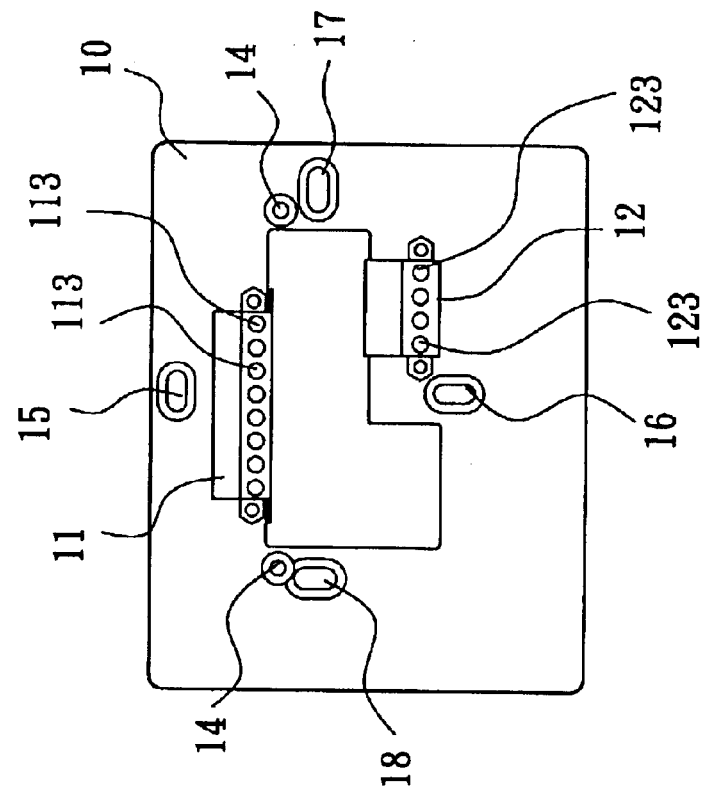
FIG. 3 is a front view of a base seat of an IA switch according to the present invention.
Figure 2:
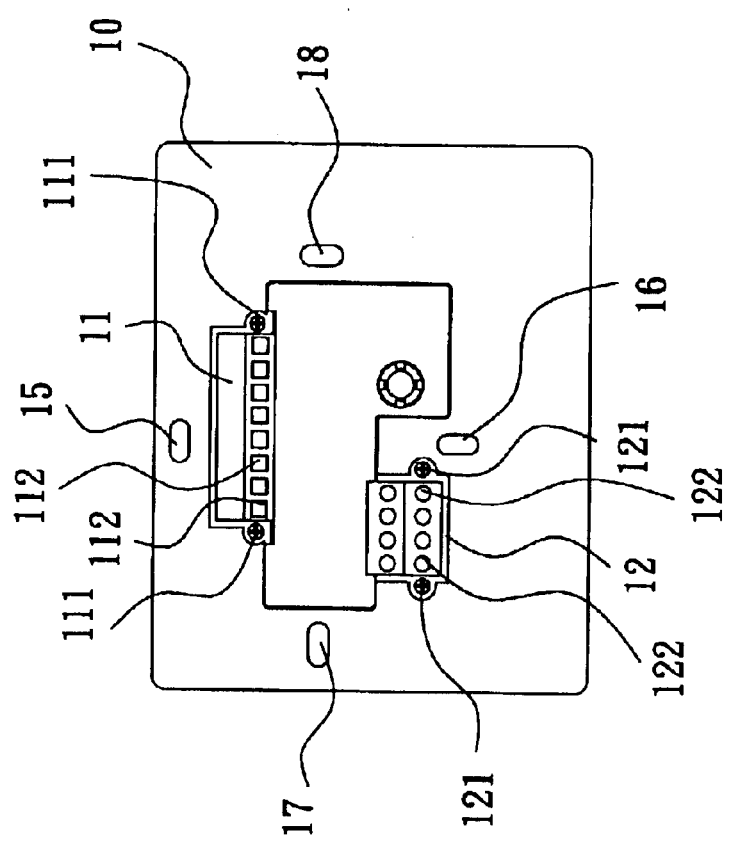
FIG. 2 is a back view of a base seat of an IA switch according to the present invention.

Please refer to FIG. 1. An IA switch according to the present invention comprises a base seat 10, circuit board 20, panel 30, pattern plate 40 and plastic film 50. Two connectors 11 and 12 are disposed in the base seat 10. Besides, a groove 13 (or a hole), two projecting columns 14 and four connection holes 15, 16, 17 and 18 are also disposed in the base seat 10. An axial screw hole 141 is disposed at the end part of each column. Two pairs of the connection holes 15, 16 and 17, 18 are symmetrically disposed to each other, and are corresponding to two screws in installment space with different voltage specifications so as to allow screws to fix the base seat 10 in the installment space. Please refer to FIG. 2 and 3, which are the back and front views of the base seat 10. A plurality of screws 111 and 121 are respectively used to fix the two connectors 11 and 12 onto the base seat 10. A plurality of holes 112 and 122 are respectively disposed at the backsides of the two connectors 11 and 12 to connect with power cords and Internet lines respectively. In a preferred embodiment, the holes 112 of the connector 11 are connected to power cords respectively and the four holes 122 of the connector 12 are connected to two Internet lines and two power cords respectively. The two power cords supply power needed for the electronics elements on the circuit board 20. A plurality of holes 113 and 123 disposed respectively at the front sides of the connectors 11 and 12 are communicated respectively with the holes 112 and 122.

Figures 4, 5:
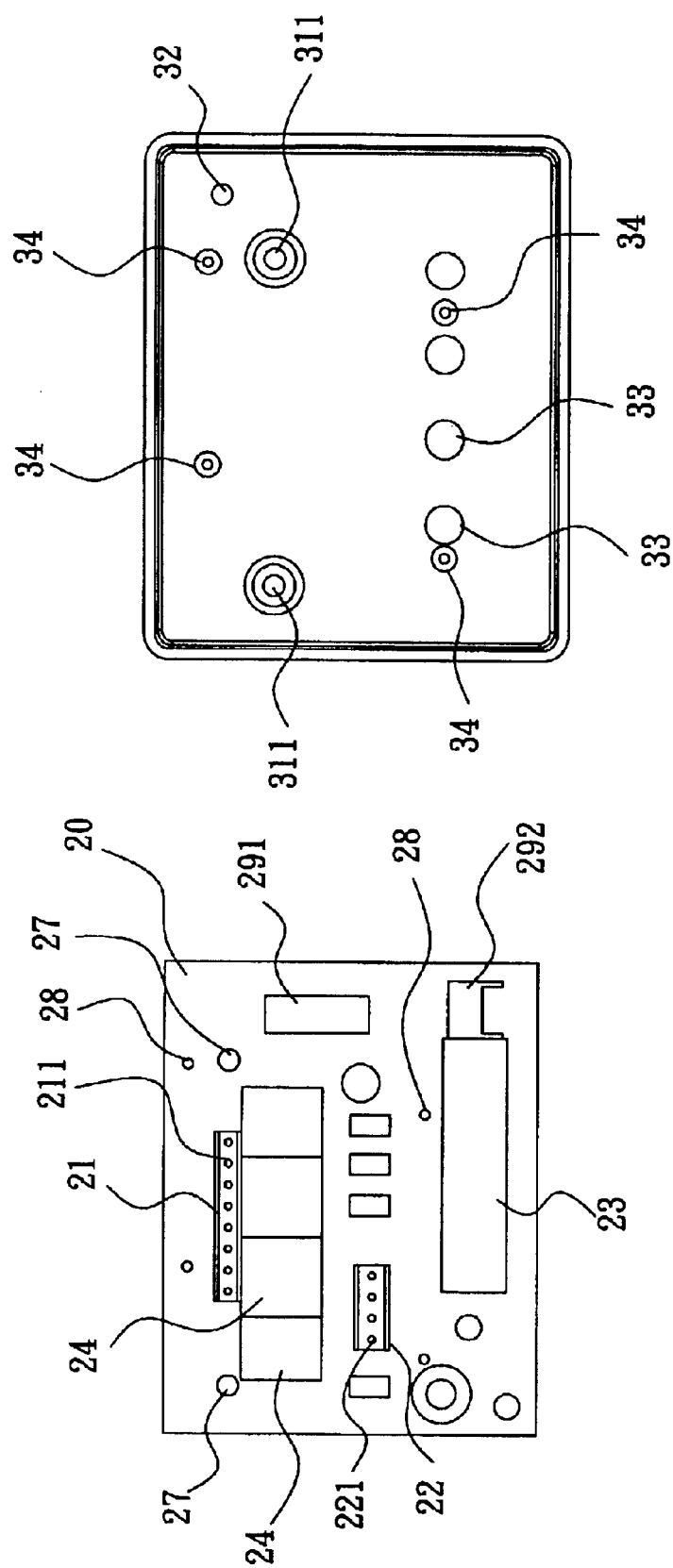
FIG. 4 is a back view of a circuit board of an IA switch according to the present invention.
FIG. 5 is a back view of a panel of an IA switch according to the present invention.

Please refer to FIGS. 1 and 4. The circuit board 20 has a circuit structure and is connected with two plugs 21 and 22, a chip 23, a plurality of relays 24, an infrared rays receiver 25, a plurality of lamp-attached button switch 26 and etc. The circuit structure mentioned above is not a key point of the present invention. The circuit board 20 also has two holes 27 for the two projecting columns 14 at the base seat 10 to pass through it; and it has many holes 28 therein for a plurality of screws 281 to pass through to be screwed at the backside of the panel 30 so as to connect the circuit board 20 with the panel 30. The plugs 21 and 22 have a plurality of male terminals 211 and 221. The male terminals 211 and 221 can be inserted respectively into the holes 113 and 123 at the front sides of the connectors 11 and 12 so as to allow the male terminals to communicate respectively with the Internet lines and power cords. Furthermore, an input signal connector 291 and connector 292 are integrated to the circuit board 20. Other dry contacts such as the output end of a magnetic spring switch, micro touch switch, infrared rays sensor, temperature detector or smoke detector can be connected to the input signal connector 291 so as to allow the chip to detect the output signals from these devices. The chip 23 used here can be one of 68 series chips produced by Motorola Corporation. The connector 292 can be connected to an outside infrared rays receiver to allow the chip 23 to detect the transmitted signals from the outside infrared rays receiver.

Please refer to FIGS. 1 and 5. Two grooves 31 and a plurality of holes 32 and 33 corresponding to the infrared rays receiver 25 and the lamp-attached switches 26 are disposed in the panel 30 to prevent the front end of the infrared rays receiver 25 from blocking and to allow the lamp-attached switches to project out of the holes 33. A plurality of projecting columns 34 corresponding to the holes 28 in the circuit board 20 are disposed at the backside of the panel 30. Each projecting columns 34 has a screw hole to receive a screw 281. Two holes 311 in the two grooves 31 are used to receive the two projecting columns 14 in the base seat 10. Two screws 35 are screwed respectively into the screw holes 141 in the two projecting columns 14 and the two nuts of them are located in the two grooves 31 to allow the panel 30 and the base seat 10 to combine together.

Figure 6:
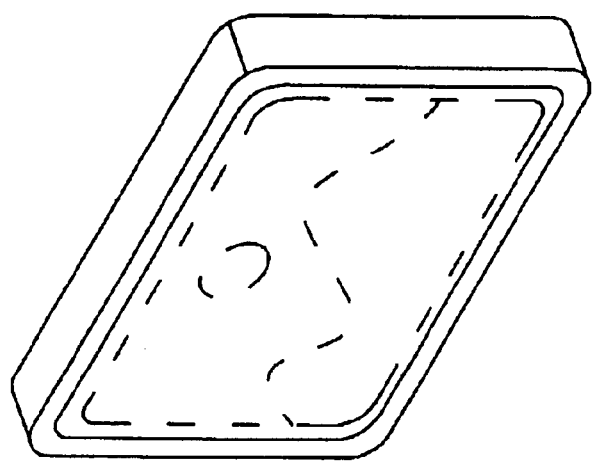
FIG. 6 is a prospective view of an IA switch according to the present invention.

Please refer to FIGS. 1 and 6. A personal favored picture printed on the pattern plate 40 can be stuck to the front side of the panel 30. The plastic film 50 can be semi-reflection film; it is stuck on the front side of the pattern plate 40 to allow the IA switch to be used as a mirror concurrently. When light is emitted from the lamp-attached switch 26, the light can penetrate the pattern plate and the plastic film 50 to allow a user to know clearly where the switch is. Holes 41 and 51 can be disposed at the locations of the pattern plate 40 and the plastic film 50 corresponding to the infrared rays receiver 25 to allow the infrared rays receiver 25 to have a better receiving result.

Figure 8:
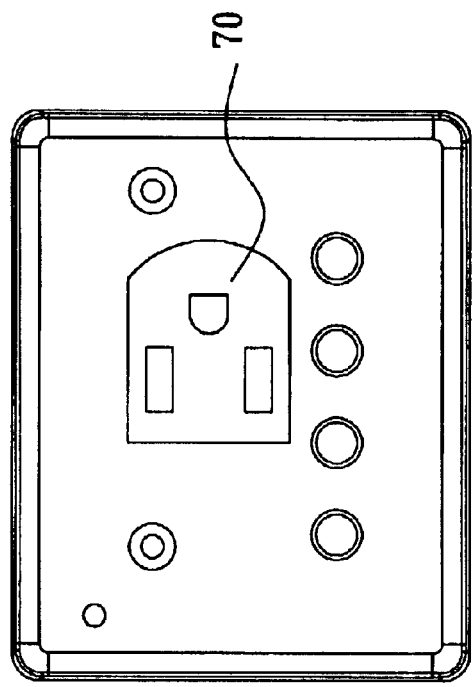
FIG. 8 is a schematic view of an IA switch with three-holes socket according to the present invention.
Figure 7:
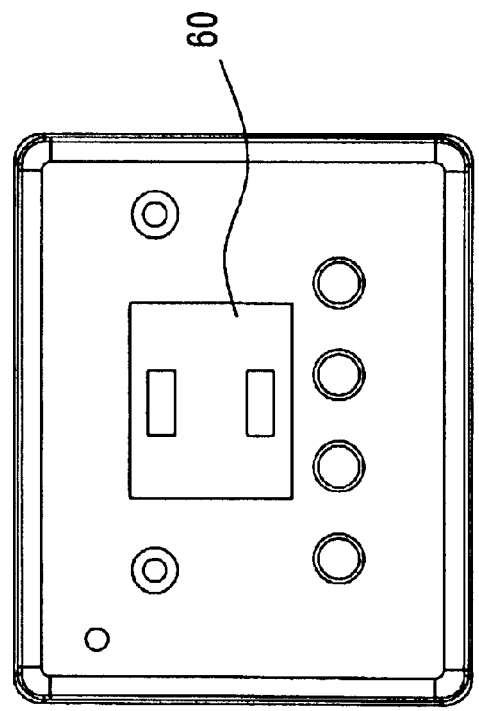
FIG. 7 is a schematic view of an IA switch with two-holes according to the present invention.

Please refer to FIGS. 7 and 8. The IA switch can also have a two-holes type socket 60 or three-holes socket 70 so as to allow the IA switch to be used as a socket concurrently.

A user can use the infrared rays remote controller or press the lamp-attached button switch to emit an on or off signal owing to connection between the IA switch according to the present invention and the Internet lines; related far end Internet accessible appliances can be controlled through the Internet lines when the chop senses the signal. Or, the relays are controlled to operate the on and off of general appliances communicated with the relays. For example, the IA switch installed in a living room can be used to control the on and off of a door lock, air conditioner, kitchen lamp or others.

The connector in the base seat according to the present invention can be conveniently connected with power cords and Internet lines. The screws used in the present invention are convenient for the base seat to connect with the installment space of a conventional switch. The panel and the circuit board used in the present invention are whole modules and detachable sets and different numbers and locations of switches and sockets can be disposed according to the need. The plugs at the fixed positions on the circuit are used to connect conveniently with the connector on the base seat. Therefore, the panel and the circuit board with different utilization function can be connected to the same base seat. The input signal connector according to the present invention can be connected to other sensors, and the on and off of related appliances can be controlled by the output signals of these sensors controlled by the chip to transmit through Internet lines, or the relays controlled by the chip through power cords communicated with the relays.

It is noted that the IA switch described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. An IA switch, comprising a base seat, circuit board and panel; wherein said base seat is connected to a connector, at least four holes connected respectively with power cords and Internet lines are disposed at a backside of said connector; said circuit board is integrated with a plug, chip, at least one relay and at least a button switch; said circuit board is combined with said panel at a backside thereof; said plug is combined with said connector at a front side thereof; said panel has holes corresponding to said button switches; the front ends of said button switches is projected out of said holes; and said panel is combined to an outside of said base seat.

2. The IA switch according to claim 1, wherein said base seat has at least two connection holes.

3. The IA switch according to claim 2, wherein a picture is stuck at the front end of said circuit board.

4. The IA switch according to claim 3, wherein a front side of said picture is covered with a plastic film.

5. The IA switch according to claim 4, wherein locations at a front end of an infrared ray receiver corresponds to said picture and said plastic film have holes respectively.

6. The IA switch according to claim 4, wherein said plastic film is semi-reflection film.

7. The IA switch according to claim 1, wherein said button switch is a lamp-attached button switch.

8. The IA switch according to claim 1, wherein said base seat has two projecting columns; said two projecting columns have axial screw holes respectively; said circuit board and said panel have holes corresponding to said two projecting columns; said holes of said panel are disposed at bottoms of two grooves respectively; screws are screwed into said holes respectively, and nuts on said screws are located in said two grooves.

9. The IA switch according to claim 1, wherein said circuit board has at least three holes; screws corresponding to said at least three holes are passed through said at least three holes, and are screwed into the screw holes of said projecting columns corresponding to said holes disposed at a backside of said panel.

10. The IA switch according to claim 1, wherein an infrared ray receiver is further connected at the front end of said circuit board; a hole is disposed at said panel corresponding to a front end of said infrared ray receiver.

11. The IA switch according to claim 1, wherein circuit board is further combined with an input signal connector.

12. The IA switch according to claim 1, wherein said circuit board is further combined with a connector connected to an outside infrared rays receiver.

13. The IA switch according to claim 1, wherein said base seat has at least one groove; said at least one relay is received in said at least one groove of said base seat.

14. The IA switch according to claim 1, wherein said base seat is combined with two connectors, at least two holes that are connected with power cords respectively are disposed at the backside of one of said connector.

15. The IA switch according to claim 1, wherein the plugs of said circuit have male terminals corresponding to the at least four holes at the front end of said connector, said male terminal are received in said holes.

16. The IA switch according to claim 1, wherein said base seat has four connection holes.

* * * * *